US008581710B2

(12) United States Patent
Heubel et al.

(10) Patent No.: US 8,581,710 B2
(45) Date of Patent: *Nov. 12, 2013

(54) SYSTEMS AND METHODS FOR HAPTIC CONFIRMATION OF COMMANDS

(75) Inventors: Robert W. Heubel, San Leandro, CA (US); Erin Ramsay, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,578

(22) Filed: Sep. 5, 2012

(65) Prior Publication Data

US 2013/0088340 A1    Apr. 11, 2013

Related U.S. Application Data

(63) Continuation of application No. 12/612,230, filed on Nov. 4, 2009, now Pat. No. 8,279,052.

(51) Int. Cl.
*G08B 6/00* (2006.01)

(52) U.S. Cl.
USPC ...................... 340/407.1; 340/407.2; 715/702

(58) Field of Classification Search
USPC .................... 340/407.1, 407.2; 704/275, 246; 715/780, 702, 816
See application file for complete search history.

(56) References Cited

U.S. PATENT DOCUMENTS

| 3,736,551 | A | 5/1973 | Hirsch |
| 5,767,796 | A | 6/1998 | Van Roekel et al. |
| 8,279,052 | B2 * | 10/2012 | Heubel et al. ............. 340/407.2 |
| 2002/0098874 | A1 | 7/2002 | Zirul et al. |
| 2002/0107695 | A1 | 8/2002 | Roth et al. |
| 2011/0061017 | A1 | 3/2011 | Ullrich et al. |
| 2011/0102160 | A1 | 5/2011 | Heubel et al. |

FOREIGN PATENT DOCUMENTS

| WO | WO 99/045531 | 9/1999 |
| WO | WO 2004/053830 | 6/2004 |
| WO | WO 2004/102527 | 11/2004 |

OTHER PUBLICATIONS

Patent Cooperation Treaty, International Search Report, Application No. PCT/US2010/054967, mailed Feb. 24, 2011.
Patent Cooperation Treaty, Preliminary report on Patentability, Application No. PCT/US2010/054967, mailed May 18, 2012.

* cited by examiner

*Primary Examiner* — Toan N Pham
(74) *Attorney, Agent, or Firm* — Kilpatrick Townsend & Stockton LLP

(57) ABSTRACT

Systems and methods for haptic confirmation of commands are disclosed. For example, one system includes a microphone; a housing configured to be contacted by a user, and an actuator in communication with the housing, the actuator configured to output a haptic effect to the housing. The system also includes a processor in communication with the microphone and the actuator, the processor configured to receive speech information from the microphone; recognize the speech information and determine a command associated with the speech information. If the speech information is recognized and the command is determined, the processor is configured to generate an actuator signal configured to cause the actuator to output a haptic effect, and transmit the actuator signal to the actuator. Otherwise, the processor is configured generate a second actuator signal configured to cause the actuator to output a second haptic effect; and transmit the second actuator signal to the actuator.

20 Claims, 7 Drawing Sheets

SYSTEMS AND METHODS FOR HAPTIC CONFIRMATION OF COMMANDS

CROSS-REFERENCE TO RELATED APPLICATIONS

This application is a continuation of U.S. patent application Ser. No. 12/612,230, entitled "System and Methods for Haptic Confirmation of Commands," filed Nov. 4, 2009, now U.S. Pat. No. 8,279,052, which is hereby incorporated by reference in its entirety.

FIELD OF THE INVENTION

The present invention generally relates to haptic feedback and more particularly to haptic confirmation of commands.

BACKGROUND

Commands to electronic devices have typically been issued by pressing a button or flipping a switch. However, voice and other types of commands are becoming more prevalent in user interfaces, such as the voice-commanded dialing of cell phones. In such systems, a user may speak a command into a microphone to dial a friend's phone number, and the user may hear a beep or see a light flash to indicate that the phone is dialing the number. But if the cell phone's speaker is already being used, such as because the phone is playing a song, the cell phone may interrupt the music to play the beep, or, if sounds have been muted, it may not provide an acknowledgement to the user at all. Thus, it may be desirable to provide other mechanisms for providing responses to the user.

SUMMARY

Embodiments of the present invention provide systems and methods for haptic confirmation of voice commands. For example, in one embodiment, a method for haptic confirmation of commands comprises receiving speech information from a microphone, recognizing the speech information and determining a command associated with the speech information, and if the speech information is recognized and the command is determined, generating a first actuator signal configured to cause an actuator to output a first haptic effect, and transmitting the first actuator signal to the actuator. Otherwise, generating a second actuator signal configured to cause the actuator to output a second haptic effect, and transmitting the second actuator signal to the actuator. Another embodiment comprises a computer-readable medium comprising program code for executing such a method.

These illustrative embodiments are mentioned not to limit or define the invention, but to provide examples to aid understanding thereof. Illustrative embodiments are discussed in the Detailed Description, and further description of the invention is provided therein. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying figures, wherein.

DETAILED DESCRIPTION

Embodiments of the present invention provide systems and methods for haptic confirmation of commands. For example, in one embodiment, a user may speak a command into a microphone on a cellular telephone, such as "call home." The phone attempts to recognize the spoken command, and if it is successful, it generates a haptic effect to provide a tactile indication to the user that the spoken command was recognized and that the phone will perform the requested function. The phone may then attempt to make a phone call to a telephone number corresponding to "home." However, if the phone does not recognize the command, it generates a second haptic effect to provide a tactile indication to the user that the spoken command was not recognized and that no function would be executed.

In another embodiment, a first user and a second user may be in communication with each other using wireless communication devices, such as radios. Each user has a headset with a microphone and a radio in communication with the microphone. The headset also includes an actuator for outputting haptic effects. The first user may issue a verbal command to the second user over the radio. The second user may be unable to provide a verbal response to the first user. For example, the second user may be located in a combat zone near enemy combatants. The second user may respond to the verbal command by pressing a button or series of buttons on his head set or on the radio to cause a haptic message to be transmitted to the first user. The first user's radio may receive the haptic message, and transmit a signal to the actuator in the first user's headset to cause the actuator to output a haptic effect to the first user.

Illustrative System for Haptic Confirmation of Commands

Figure 1:
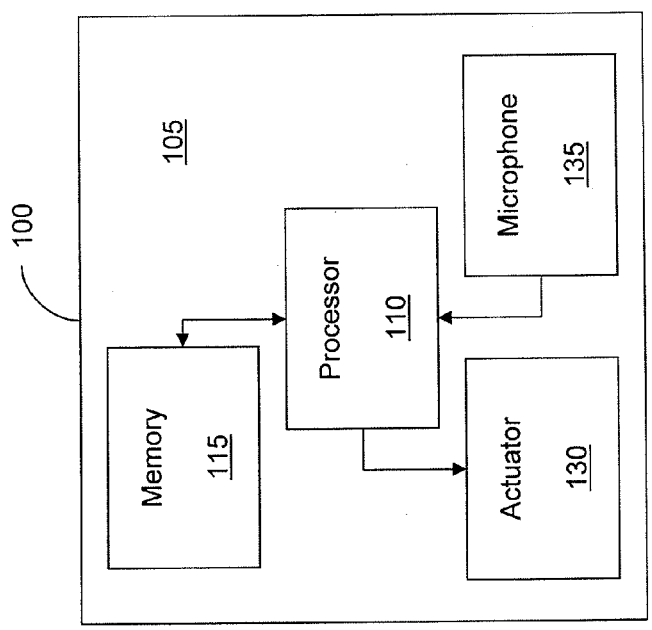
FIGS. 1-4 show block diagrams of systems for haptic confirmation of commands according to embodiments of the present invention.

Referring now to the figures in which like numbers refer to like elements throughout the several drawings, FIG. 1 shows a block diagram of a system for haptic confirmation of commands according to one embodiment of the present invention. In the embodiment shown in FIG. 1, the system comprises a device 100 having a housing 105. The device further comprises a processor 110, a memory 115, an actuator 130, and a microphone 135, each of which is disposed in, or coupled to, the housing 105. In the embodiment shown in FIG. 1, the device 100 is a cell phone and the housing 105 is configured to be grasped by a user, who can speak into the microphone 135. In some embodiments, the device 100 may be a headset comprising a housing 105, a processor 110, a memory 115, an actuator 130, and a microphone 135. In some embodiments, the device 100 may comprise a system having a plurality of devices. For example, FIG. 2, which will be discussed in greater detail below, comprises two devices 110, 150 in communication with each other.

Referring again to the embodiment shown in FIG. 1, the processor 110 is in communication with the memory 115, actuator 130, and microphone 135. The microphone 135 encodes speech information received from the user into one or more microphone signals that are transmitted to the processor 110. The processor 110 receives the microphone signals and executes voice recognition software stored in memory 115 to attempt to recognize the speech information encoded within the received microphone signals. If the processor 110 is able to recognize the speech information, it executes software stored in memory 115 that attempts to identify a command associated with the recognized speech information. If the processor 110 identifies a command associated with the recognized speech information, it generates a first actuator signal configured to cause the actuator to output a first haptic effect. The first haptic effect is configured to indicate to the user that the voice command was recognized. The processor 110 then transmits the first actuator signal to the actuator 130, which outputs the first haptic effect based on the first actuator signal.

However, if the speech information is not recognized, or if a command corresponding to the speech information is not found, the processor 110 generates a second actuator signal configured to cause the actuator 130 to output a second haptic effect. The processor 110 then transmits the second actuator signal to the actuator 130, which outputs the second haptic effect based on the second actuator signal. The second haptic effect is configured to indicate that the speech information was not recognized, or that a corresponding command was not found. In one embodiment, however, different haptic effects may be output for a failure to recognize the speech information or failure to find a command corresponding to the recognized speech information. Note that the identifiers "first" and "second" are used here to differentiate between different signals and effects, rather than a sequence of particular signals or effects. For example, if the voice command is not recognized, only the second actuator signal is generated and transmitted to the actuator; the first signal, indicating that the voice command was recognized, is not generated or transmitted to the actuator.

The embodiment in FIG. 1 can comprise any of a number of devices, such as a handheld device, a wearable device, a vehicle (e.g. a car, a wheelchair, etc.), a non-portable device (e.g. a desktop computer), or other devices capable of receiving voice commands, processing them, and generating haptic effects.

For example, in one embodiment, the device 100 comprises a personal digital assistant (PDA). In such an embodiment, a user may speak a voice command into the microphone 135 to cause the PDA to perform a function. For example, the user may instruct the PDA to add an appointment to the calendar for Tuesday at 3 pm. The processor 110 attempts to recognize the voice command and if the processor 110 recognizes the voice command, the processor 110 then generates an actuator signal and transmits the actuator signal to the actuator to cause the actuator to output a haptic effect to indicate that the voice command was recognized. Alternatively, if the voice command was not recognized, the processor 110 may generate a second actuator signal and transmit the second actuator signal to the actuator to cause the actuator to output a haptic effect to indicate that the voice command was not recognized.

In a similar embodiment, the processor 110 may partially recognize the command. For example, the processor 110 may recognize that the speech command was to add an appointment to the calendar, but may not have recognized the time of the appointment. In such an embodiment, the processor 110 may generate a third actuator signal and transmit the third actuator signal to the actuator to cause the actuator to output a haptic effect to indicate that the voice command was partially recognized. In such an embodiment, the haptic effect may indicate not only that the command was partially recognized, but which part of the command was not recognized. For example, if the date was not recognized, the device may output a fourth haptic effect, while if the time was not recognized, the device may output a fifth haptic effect. Using haptic signaling, a user may be apprised of difficulties understanding the spoken command without needing to resort to viewing a display to determine the source of the problem.

In a similar embodiment, the processor 110 may generate actuator signals as parts of a speech command are received and recognized or not recognized. For example, in one embodiment, a user may say "add appointment to calendar for Tuesday, September 2 at 3 pm." The processor may recognize "add appointment to calendar" and generate a first actuator signal to cause the actuator to output a first haptic effect to indicate that a portion of the command was recognized. The first haptic effect is then output very shortly after the user has said "add appointment to calendar" to indicate to the user that this portion of the speech command was recognized. Another haptic effect may then be output after the date is recognized or not recognized, and a third haptic effect may then be output after the time is recognized or not recognized. The user may then re-state the unrecognized portion of the command. Haptic effects that are output corresponding to parts of a speech command may indicate to the user which portion of the command needs to be repeated rather than requiring the user to restate the entire command.

Still further haptic effects may be output to a user in response to a voice command. For example, in the embodiments described above in which a user attempts to add an appointment to a calendar on a PDA, additional haptic effects may be used. For example, if the processor 110 recognizes the command, but determines that the commanded date and time would present a conflict with an appointment already stored in the calendar, the processor 110 may generate an actuator signal to cause the actuator to output a haptic effect to indicate that the command was recognized, but that a potential conflict exists. In a similar embodiment, if the processor 110 recognizes the command, but determines that the commanded date and time are adjacent to an existing appointment, the processor 110 may generate an actuator signal to cause the actuator to output a haptic effect to indicate that the command was recognized, but that the desired date and time is adjacent to an existing appointment. In such an embodiment, the haptic effect indicating a potential conflict is different than the haptic effect indicating that the appointment time is adjacent to another appointment.

As described above, some embodiments of the present invention may attempt to recognize speech information as it is received, such as in real-time. However, even in some embodiments that do not attempt to recognize speech information as it is received, it may be advantageous to perform other functions when speech information is received. For example, in one embodiment, a device 100 receives speech information from the microphone and attempts to recognize the speech information as it is received. As the device 100 begins to recognize the speech information, it may recognize a word or phrase that corresponds to a command. For example, if the user says "call home," the device 100 may recognize the word "call" and determine that it corresponds to a command to start a phone call. This may indicate to the device that the user is issuing a voice command, and the device may prepare to output a haptic effect before receiving the entire command. For example, the device 100 may warm up an amplifier (not shown) that supplies current to the actuator 130 in anticipation of generating haptic effect. The device 100 may select one or more potential haptic effects that may be output, depending on what additional speech information may be received. In one embodiment in which the device 100 does not attempt to recognize speech information as it is received, the device 100 may begin to warm-up an amplifier when it detects that it is receiving speech information. Such an embodiment may determine that speech information is being received and the speech information may comprise a voice command. Thus, it may be advantageous for the device 100 to warm-up the amplifier while it is receiving the speech information to ensure a haptic effect may be output shortly after a voice command has been recognized or not recognized.

In addition to handheld embodiments, other devices may provide haptic confirmation of voice commands. For example, in one embodiment, the device 100 comprises a desktop computer. A user may issue a command to cause the computer 100 to perform a function that takes an extended period of time to complete, such as to execute a software build. If the processor 110 recognizes the command, it may generate a first actuator signal configured to cause the actuator 130 to output a haptic effect to the user, such as through an actuator 130 embedded within a keyboard or mouse (not shown) coupled to the computer 100. Then, as the processor 110 executes the function, it may periodically transmit a second actuator signal to the actuator 130 within the keyboard or mouse to indicate that the function is still executing. Such a haptic effect may be a low magnitude vibration designed to provide unobtrusive status information to the user. In another embodiment, the vibration may initially be unobtrusive, but may get stronger as the function gets nearer to completion. For example, the magnitude of the vibration may increase, or the frequency may increase or decrease. When the processor 110 completes the function, it may generate and transmit a third actuator signal to the actuator 130 within the keyboard or mouse to indicate that the function has completed. Alternatively, if an error occurs during execution of the function, such as a build error, a haptic effect may be output to indicate that the function terminated unsuccessfully. Such an embodiment may be useful in contexts where a user begins a function on a device 100 and allows the function to execute in the background, but the device 100 is able to keep the user apprised of the status of the function. For example, a user may issue a voice command to his cell phone to initiate a download of an application from a remote server over a cellular network. The user may then put the cell phone back in his pocket, initiate a phone call, or perform some other task. However, the cell phone may still be able to provide haptic status of the download to the user, such as percentage of the download completed, a problem with the download, or a haptic indication when the download has completed.

Figure 2:
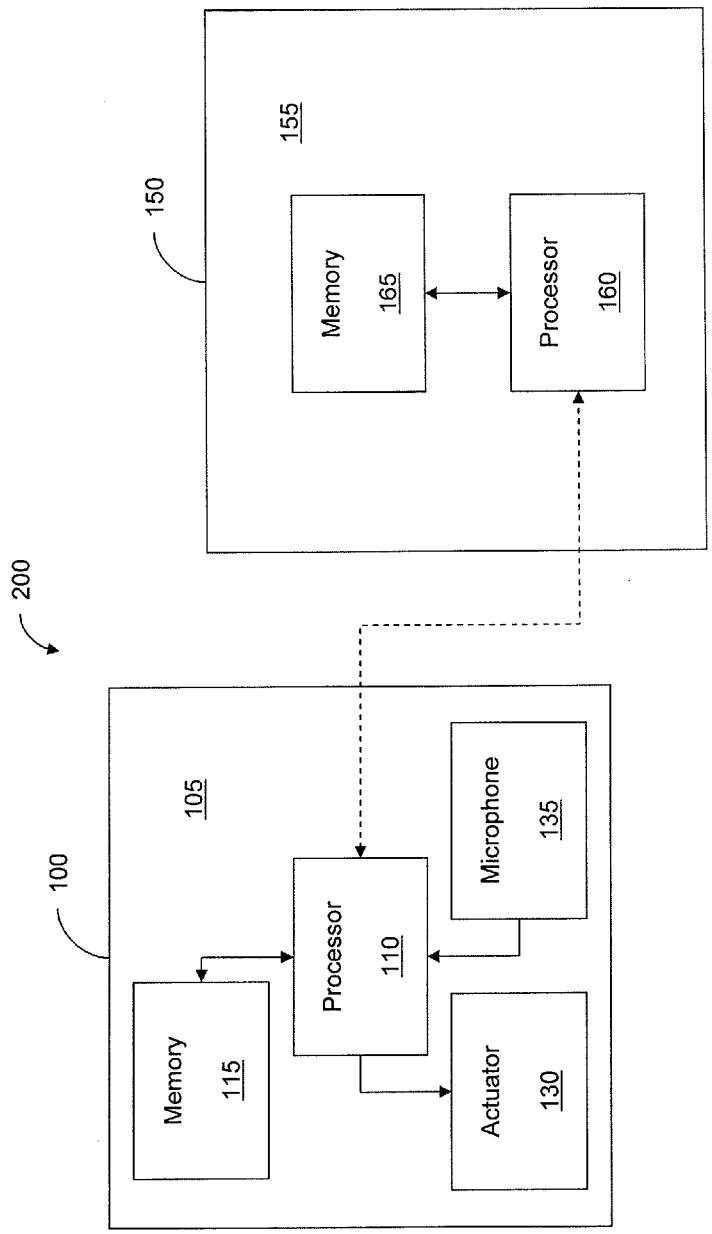

Referring now to FIG. 2, FIG. 2 shows a block diagram of a system 200 for haptic confirmation of commands according to one embodiment of the present invention. The system 200 shown in FIG. 2 comprises a first device 100 and a second device 150 where each device 100, 150 is in communication with the other device using connection 170. The first device 100 comprises the components described with respect to FIG. 1. The second device comprises a processor 160 in communication with a memory 165. The processor 110 in the first device 140 is in communication with the processor 160 in the second device 150. For example, in one embodiment, the two processors 110, 160 communicate over a wireless connection, such as via Bluetooth. In some embodiments, the wireless connection may comprise an infrared link, an RF link, a Wifi link, or other wireless connection. In another embodiment, the two processors 110, 160 are in communication over a wired connection, such as a serial or parallel connection or Ethernet connection. Using the connection 170, processor 110 is able to transmit signals to and receive signals from processor 160, though in some embodiments the connection 170 may be a one-way connection.

For example, in one embodiment, device 100 comprises a Bluetooth headset and device 150 comprises a cell phone. In such an embodiment, The microphone 135 encodes speech information received from the user into one or more microphone signals that are transmitted to the processor 110. The processor 110 in the headset then causes the microphone signals to be transmitted to the processor 160 in the cell phone. Processor 160 then executes voice recognition software stored in memory 165 to attempt to recognize the speech information encoded within the received microphone signals. If the processor 160 is able to recognize the speech information, it executes software stored in memory 165 that attempts to identify a command associated with the recognized speech information. If the processor 160 identifies a command associated with the recognized speech information, it generates a first actuator signal configured to cause the actuator to output a first haptic effect. The processor 160 transmits the first actuator signal to processor 110, which then transmits the first actuator signal to the actuator 130. In some embodiments, the processor 110 transmits a signal to the actuator to cause the actuator to power-up in preparation for outputting a haptic effect. In another embodiment, processor 160 transmits the first actuator signal to the actuator 130.

However, if the speech information or a corresponding command is not recognized, the processor 160 generates a second actuator signal configured to cause the actuator 130 to output a second haptic effect. The processor 160 transmits the second actuator signal to processor 110, which then transmits the second actuator signal to the actuator 130. In another embodiment, processor 160 transmits the second actuator signal to the actuator 130. After receiving the second actuator signal, the actuator 130 outputs a second haptic effect based on the second actuator signal.

In some embodiments, processor 160 may transmit high level actuator signals to processor 110. Processor 110 may then generate a low-level actuator signal based on the high-level actuator signal. Processor 110 may then transmit the low-level actuator signal to the actuator 130 to cause the actuator 130 to output a haptic effect. More detailed descriptions of high-level and low-level actuator signals may be found in U.S. Pat. No. 5,734,373, entitled "Method and Apparatus for Controlling Force Feedback Interface Systems Utilizing a Host Computer," filed Dec. 1, 1995 and issued Mar. 31, 1998, the entirety of which is incorporated herein by reference.

Referring again to FIG. 2, one embodiment of the present invention may provide haptic effects that emulate the command determined by the processor 110, 160 or the function performed by the processor 110, 160. For example, in one embodiment, the first device 100 comprises an earbud and the second device 150 comprises a cell phone. In such an embodiment, a user may issue a voice command, such as "call home." The processor 110 transmits the speech information received from the microphone 135 to the processor 160 in the second device 150. The processor 160 recognizes the voice command and generates a series of haptic effects corresponding to each number dialed and each ring of the phone being called. Actuator signals corresponding to the haptic effects are transmitted to the processor 110 in the first device 100, which outputs the haptic effects, such as at a time corresponding to each button press and each ring.

Figure 3:
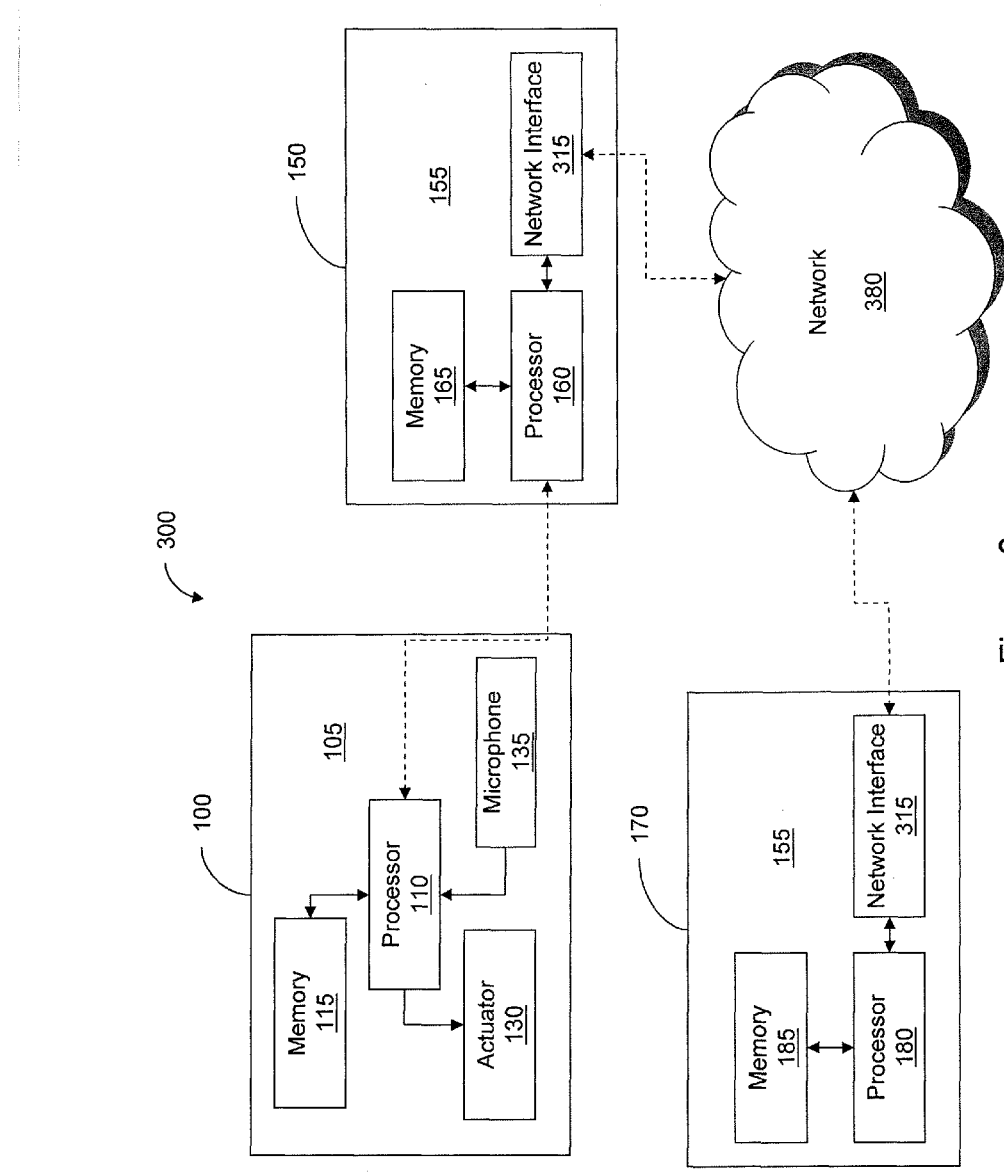

In other embodiments, a haptic command may be received from a processor associated with a remote device. For example, FIG. 3 shows a block diagram of a system 300 for haptic confirmation of commands according to one embodiment of the present invention. In the embodiment shown in FIG. 3, a system 300 for haptic confirmation of commands comprises a haptically-enabled medical alert device 100 in communication with a communications device 150. The communications device is in communication with a remote system 170. In this embodiment, the medical alert device 100 is in communication with the communication device 150 using an RF link, such as an RF link using standard cordless phone frequencies. The medical alert device 100 is configured to be worn by a user, such as around the user's neck or wrist. The medical alert device 100 can be used by the user to indicate a medical emergency, such as a fall or heart attack. For example, the user may speak into a microphone on the device, such as by saying "help" or by pressing a button and speaking a command, such as "help" or "emergency." In the embodiment shown in FIG. 3, the processor 110 in the medical alert device 100 then transmits one or more signals to the processor 160 in the communications device 150. The communications device 150 then initiates a connection to the remote system 170 and transmits one or more signals to the remote system 170 indicating that the user has signaled a medical emergency. In such an embodiment, the remote system 170 may be monitored by a dispatcher who can dispatch an ambulance or other services to aid the user.

During the transmission of messages between the medical alert device 100, the communication device 150, and the remote system 170, additional haptic effects may be generated and output. For example, in the embodiment shown, the communication device 150 may send a message to the medical alert device 100 that causes the medical alert device 100 to output a haptic effect to indicate that an emergency call has been initiated. After the call has been answered, the communication device 150 may cause a second haptic effect to be output to indicate that the call was answered. Alternatively, or in addition, the dispatcher may cause a signal to be transmitted across the network 380 to the processor 160 in the communications device 150. For example, the dispatcher can provide haptic signals to the user to indicate that their request was received and that help is on the way. The processor 160 may then transmit a high-level actuator signal to the processor 110 in the medical alert device to cause a haptic effect to be output. The processor 110 in the medical alert device may then generate a low-level actuator signal based on the received signal from the processor 160 and transmit the actuator signal to the actuator to cause a haptic effect to be output. For example, the dispatcher may transmit a long vibration to indicate that the request was received, followed later by additional vibrations to indicate that an ambulance has been dispatched. The dispatcher may periodically transmit such haptic signals to indicate that he is still paying attention to the user and their request is being responded to. Such an embodiment may be advantageous for a person who has difficulty hearing or seeing. It may also provide assurance to the user that their request for help has been received and that the dispatcher is still handling their needs.

Figure 4:
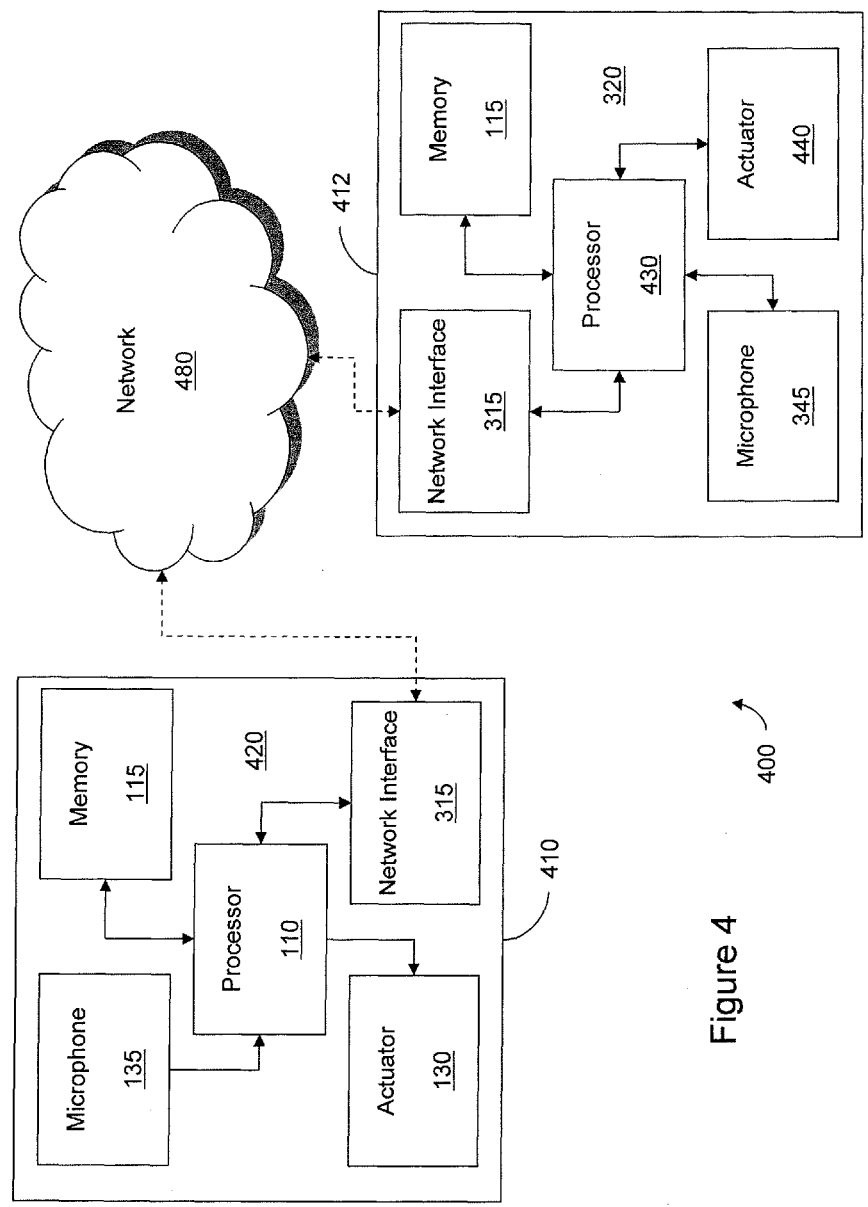

Referring now to FIG. 4, FIG. 4 shows a block diagram of a system 400 for haptic confirmation of commands according to one embodiment of the present invention. The system 400 shown in FIG. 4 comprises two devices 410, 412 in communication with each other via network 480. Device 410 comprises a device 100 as shown in FIG. 1. Device 425 also comprises a processor 430, a memory 115, a microphone 435, and an actuator 440 as described with respect to FIG. 1. However, each device 410, 412 also comprises a network interface 315. Each network interface 315 is in communication with its respective processor 110, 430 and is configured to communicate with network 480, thus enabling the devices 410, 412 to communicate with each other over network 480. In such an embodiment, device 410 is capable of receiving a voice command from its microphone 435 and transmitting the voice command to device 412. For example, in one embodiment, the speech information received from the microphone 135 may be transmitted over the network 480 so that a user of device 412 can hear the voice command, such as via a speaker (not shown). The user may confirm that the command was recognized by pressing a button on device 425 to send a signal indicating an acknowledgment that the voice command was received. Device 410 may receive the signal, and processor 110 may generate an actuator signal and transmit the actuator signal to the actuator to cause the actuator to output a haptic effect to the user. In some embodiments, the user may respond by providing a haptic indication that the command was not received, or that the command was garbled or unintelligible. In one such embodiment, the user may also provide a haptic indication to request a re-transmission of the message.

In another embodiment, a user may respond to a received voice command by providing haptic inputs, such as by pressing a button or tapping on a touch-sensitive device. Each of the haptic inputs may be correlated to a response, which may be converted to a spoken command and transmitted to a recipient. For example, a soldier may tap a response to a command into a touch-sensitive input device coupled to a communication device, such as device 412, in a sequence to indicate that the command was received and that the soldier will comply. The device 412 may then transmit the tactile response to another device, such as device 410, which then converts the tactile response into an audible signal, such as a spoken message. In such an embodiment, the tactile response may correspond to a pre-recorded message or to pre-determined text that may be converted to speech by the device 412. Such an embodiment, would allow for a silent acknowledgement by a user that results in a spoken reply to the recipient.

The system shown in FIG. 4 may also be advantageously used by multiple users to perform coordinated tasks or procedures. For example, in one embodiment, devices 410 and 412 may comprise computers in different locations within a bank. Each computer 410, 412 is in communication with a security system that controls access to a bank vault. Users at the two computers may need to perform functions, or provide authentication to open the bank vault. For example, a user at the first computer 410 may be required to speak a command, such as a word or phrase, to verify authorization to open the vault. After the command is recognized, a haptic confirmation may be sent to a second user at the second computer 412 to indicate that they need to speak a command, such as another word or phrase, to complete authentication to open the vault. If the second user's command is recognized, a haptic confirmation may be output at each of the two devices 410, 412 to indicate to the users that the command was successful. At such a time, the lock on the bank vault may be disengaged.

However, if one of the commands was not recognized, one or both users may receive a haptic indication that the authentication failed. In one embodiment, the user whose command failed may be given a second opportunity to provide authentication. In such an embodiment, a haptic effect indicating that the authentication failed but that the command may be retried may be output to one or both users. However, if the authentication has finally failed such that no retries are available, a different haptic effect may be output to one or both users to indicate that authentication failed.

Still further embodiments including different or more complicated sequences of events may be used. In such embodiments, haptic effects may be output to one or more users to indicate that action on their part is necessary to complete the sequence. For example, in one embodiment, multiple mechanics may be repairing a large machine. In such a scenario, each user may wear a device, such as device 410 or 412. As users complete portions of the repair or need assistance, they may transmit commands to trigger haptic effects on other users' devices 410, 412. By doing so, the next user may be notified that a task is complete or that they need to perform some action to continue the repair process. The recipient of the haptic effect may provide a haptic confirmation back to the sender of the command to indicate that the recipient will take the necessary action or some other indication.

Figure 5:
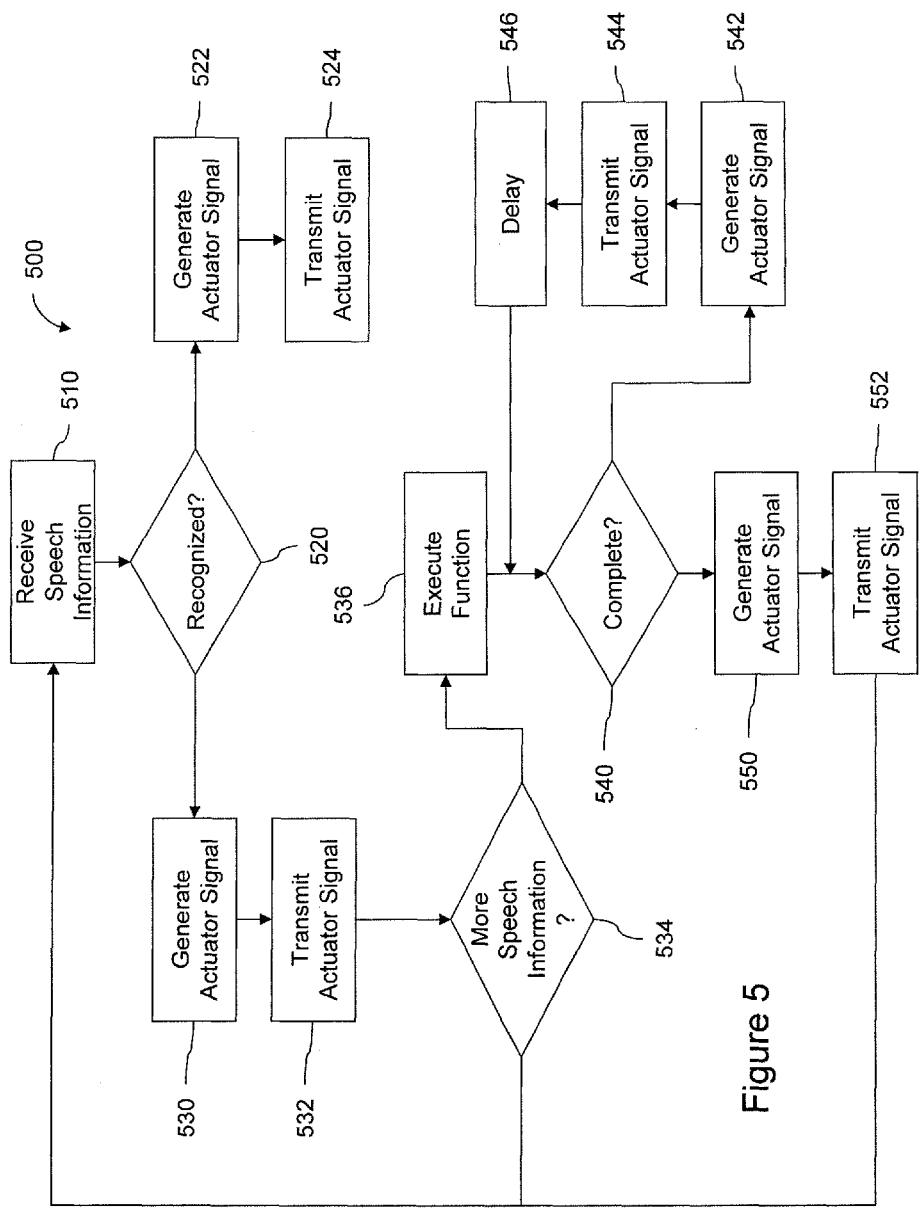
FIG. 5 shows a flow diagram of a computer-implemented method for haptic confirmation of commands according to one embodiment of the present invention.

Referring now to FIG. 5, FIG. 5 shows a flow diagram of a computer-implemented method 500 for haptic confirmation of voice commands according to one embodiment of the present invention. The method 500 shown in FIG. 5 will be discussed with reference to the device 100 shown in FIG. 1.

The method 500 begins in block 510 when a processor 100 receives speech information. For example, the processor 110 may receive speech information encoded in a microphone signal from a microphone 135 or it may receive the speech information from another processor, such as over a Bluetooth connection. After receiving speech information, the method proceeds to block 520.

At block 520, after receiving the speech information, the processor 100 then executes speech recognition software to recognize the speech information. If the processor recognizes the speech information, it attempts to determine a command associated with the speech information. If the processor 110 determines a command associated with the speech information, the method proceeds to step 530. However, if the processor is unable to recognize the speech information, or is unable to determine a command associated with the speech information, the method proceeds to block 522.

In block 522, the processor 110 generates a second actuator signal configured to cause an actuator to output a second haptic effect. The second haptic effect is configured to indicate to the user that the speech information was not recognized, or that no command corresponding to the speech information was found. The processor 110 then transmits the actuator signal to the actuator 130 as shown in block 524.

In block 530, the processor 110 generates a first actuator signal configured to cause an actuator to output a first haptic effect. The first haptic effect is configured to indicate to the user that the speech information was recognized and that a command corresponding to the speech information was found. The processor 110 then transmits the actuator signal to the actuator 130 as shown in block 532. After transmitting the first actuator signal to the actuator 130, the method proceeds to block 534.

In block 534, the processor 110 determines whether additional speech information is available. For example, as described above, the processor 110 may attempt to recognize parts of the speech information as it is received and then provide haptic effects to indicate that parts of the speech information were recognized. For example, a user may attempt to add an event to calendar, and the processor may perform steps 510-532 or steps 510-524 for each component of the event, such as the date, time, and location of the event. If additional speech information is available to be received, the method returns to step 510 to receive the additional speech information. However, if no additional speech information is received, the method 500 proceeds to step 536.

At block 536, the processor 110 executes a function associated with the recognized speech information and the command. For example, if the speech information comprised "call home" and the determined command to dial a phone number associated with a contact called "home," the processor would then execute a dialing function to dial the number associated with "home." After the function has begun, the method proceeds to block 540 which is a test condition for a loop based on whether the function has completed or not.

In block 540, the processor 110 determines whether the function has completed or not. If the function has not completed, the method proceeds to step 542 to output a haptic effect to indicate that the function is still executing. However, if the function has completed, the method proceeds to step 550, where another haptic effect is output to indicate that the function has completed.

Blocks 542 through 546 are steps to output a haptic effect to indicate that a function is still executing. In block 542, the processor 110 generates an actuator signal corresponding to a haptic effect that indicates that the function is still executing. In one embodiment, the processor 110 may generate the same actuator signal regardless of how many times the haptic effect has been output. For example, if the function requires ten minutes to complete and a haptic effect is output every 30 seconds, the processor may generate the same actuator signal each time the haptic effect is output. Thus, a user would feel the same haptic effect about every 30 seconds. However, in some embodiments, different haptic effects may be output depending on the status of the function. For example, in one embodiment, the processor 110 may generate different actuator signals each time the method returns to block 542. In such an embodiment, the processor 110 may generate actuator signals to generate increasingly stronger haptic effects for each iteration through blocks 542-546. In one embodiment, the processor 110 may generate a different actuator signal if the function is still executing, but encounters an error. In such an embodiment, the processor 110 may generate an actuator signal associated with a haptic effect that indicates that the function encountered an error.

After generating an actuator signal in block 542, in block 544 the processor 110 transmits the actuator signal to the actuator 130 to cause the actuator to output a haptic effect. In some embodiments, the processor may transmit the actuator signal to another device comprising an actuator. For example, in the system shown in FIG. 2, processor 160 may transmit the actuator signal to processor 110. Processor 110 may then transmit the actuator signal to the actuator 130. As described above, processor 160 may transmit a high-level actuator signal to processor 110, which may then generate a low-level actuator signal that the processor 110 then transmits to the actuator 130. After the actuator signal has been transmitted, the method proceeds to block 546.

In block 546, the method delays for a period of time before returning to block 540. A delay may be advantageous to allow time to pass between haptic effects. For example, a delay may allow haptic effects to be output once every 30 seconds so that the user is not feeling haptic effects repeatedly over very short periods of time, which may be distracting to the user. However, in some embodiments, the delay time may be set to 0, which may allow haptic effects to be output as needed. After the delay has elapsed, the method returns to block 540.

After the function has completed, the method proceeds to block 550 at which time the processor 110 generates an actuator signal corresponding to a haptic effect that indicates that the function has completed. For example, in one embodiment, the processor 110 may generate an actuator signal corresponding to a haptic effect that indicates the function completed successfully. Alternatively, the processor 110 may generate an actuator signal corresponding to a haptic effect that indicates the function encountered an error and terminated before running to completion. After the actuator signal has been generated, the method proceeds to block 552 where the processor 110 transmits the actuator signal to the actuator 130 to cause the actuator 130 to output a haptic effect. After which, the method returns to block 510 and the processor 110 attempts to receive more speech information.

Figure 6:
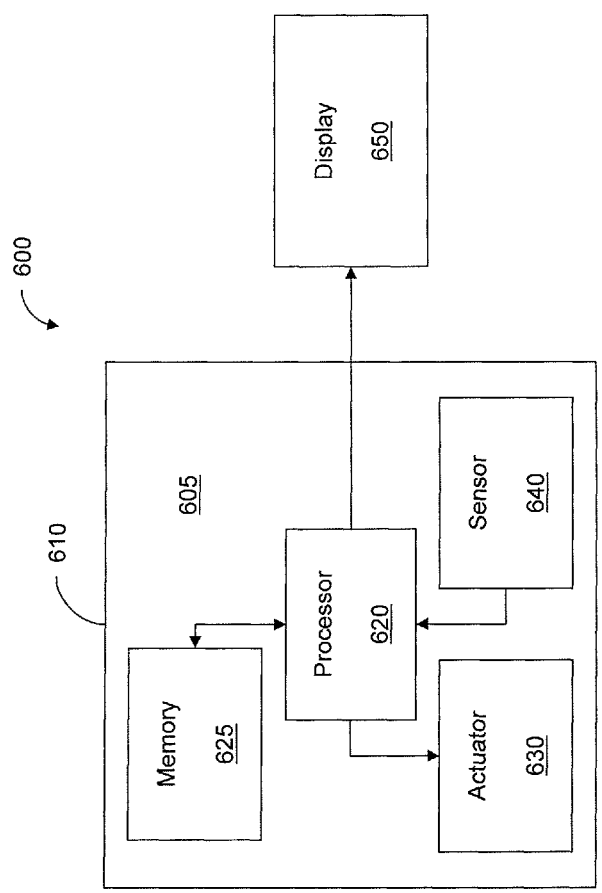
FIG. 6 shows a block diagram of a system for haptic confirmation of commands according to embodiments of the present invention.

Referring now to FIG. 6, FIG. 6 shows a block diagram of a system 600 for haptic confirmation of commands according to one embodiment of the present invention. The system 600 comprises a device 610 having a housing 605. The device 610 further comprises a processor 620, a memory 625, an actuator 630, and a sensor 640. The processor 620, the memory, 625, the actuator 630, and the sensor are each disposed within or coupled to the housing 605. The processor 620 is in communication with each of the memory 625, the actuator 630, and the sensor 640. The processor is further in communication with a display 650, which may coupled to the housing, disposed within the housing, or a separate device. The device 610 is configured to receive commands based on sensor signals received from the sensor and to output haptic effects based on the received sensor signals.

In one embodiment the device 610 may be carried or worn by a user and the sensor 640 may comprise an optical sensor configured to detect a location a user's eye is viewing. For example, display 650 may comprise a display worn by a user, such as goggles with an integrated display. The processor 620 may cause the display 650 to display images or text corresponding to commands, such as commands to control a vehicle (e.g. a wheelchair) or commands to send to another person, such as an order to a soldier. To issue a command, a user may look at the desired command. The sensor 640 detects the orientation of the user's eye is looking and transmits a sensor signal to the processor 620. The processor 620 determines a command associated with the orientation and generates an actuator signal to cause the actuator to output a haptic effect. The processor 620 then transmits the actuator signal to the actuator 630. In another embodiment, the device 610 further comprises a network interface, such as network interface 315 shown in FIG. 4. In such an embodiment, the processor 620 may receive the command from a second device, such as device 412 shown in FIG. 4, across a network 480. The device 610 may output a haptic effect to the user to indicate a command has been received and may display possible responses to the command on the display 650. The user of the device 610 may select a response from the available responses to send to the second device 412 across the network. Such an embodiment may be useful in a covert military operation where spoken commands or responses may not be desirable.

In a related embodiment, the selected response may be sent to a plurality of recipients. For example, a military unit, such as a squad of soldiers, may be in communication with a command center and provide haptic responses to received voice commands. In such an embodiment, the command center may transmit voice or haptic commands to each of the soldiers in the squad and may receive responses or acknowledgements from each soldier. A further embodiment may include multiple command centers to receive responses from each of the soldiers. For example, a commander of the squad may be in a base camp near the squad's operations or may be with the squad but separated due to the nature of the operation. In addition, other locations may monitor the squad's activities from another location, such as on a ship or at another military installation. In such an embodiment, each of the other locations may receive communications to and from the squad, including haptic commands and confirmations from the squad.

Referring again to FIG. 6, one embodiment of the present invention may output haptic effects that emulate the command issued or the function executed. For example, in one embodiment, a device 610 may be configured to control a vehicle, such as a wheelchair. In such an embodiment, it may be advantageous to provide haptic effects that emulate commands issued to the vehicle. For example, if a user selects a command to turn the vehicle to the right, the processor 620 may generate an actuator signal to cause the actuator to output a haptic effect the emulates a right turn. For example, in a wheelchair embodiment, the actuator may comprise a plurality of actuators. The actuators may then output a vibration that begins in the middle of the back of the wheelchair and moves to the right. For example, the actuators may be placed along a horizontal line in the back of the wheelchair, such that the actuators are activated in succession. The user may thus perceive the vibration moving to the right across their back and therefore receive feedback indicating that the command was recognized.

Figure 7:
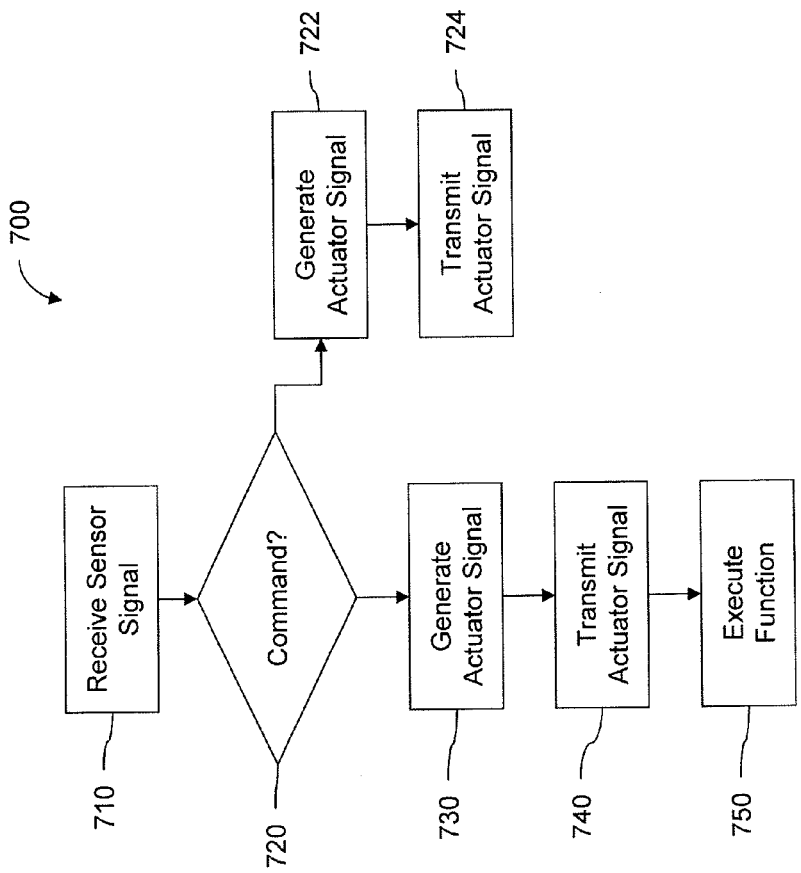
FIG. 7 shows a flow diagram of a computer-implemented method for haptic confirmation of commands according to one embodiment of the present invention.

Referring now to FIG. 7, FIG. 7 shows a flow diagram of a computer-implemented method for haptic confirmation of commands according to one embodiment of the present invention. FIG. 7 will be described with respect to the system 600 shown in FIG. 6.

In the embodiment shown in FIG. 7, the method 700 begins in block 710 when the processor 620 receives a sensor signal from the sensor 640. For example, in one embodiment the sensor signal may correspond to a user touching a location on a touch-sensitive display, such as display 650. In another embodiment, the sensor signal may correspond to an orientation of a user's eye. After receiving the sensor signal, the method 700 proceeds to block 720.

In block 720, the processor 620 attempts to identify a command corresponding to the received sensor signal. For example, the processor 620 may identify a button or user interface element at a location corresponding to a sensed position on the touch-sensitive display screen. If the processor 620 determines a command corresponding to information received in the sensor signal, the method 700 proceeds to block 730. Otherwise, the method 700 proceeds to block 722.

If the method proceeds to block 722, the processor 620 generates an actuator signal corresponding to a haptic effect configured to indicate that a command was not recognized based on the input received from the sensor. After generating the actuator signal, the method proceeds to step 724 when the processor transmits the actuator signal to the actuator 630 to cause the actuator to output a haptic effect.

If the method proceeds to block 730, the processor 620 generates an actuator signal corresponding to a haptic effect configured to indicate that a command was recognized based on the input received from the sensor. After generating the actuator signal, the method proceeds to step 750 when the processor transmits the actuator signal to the actuator 630 to cause the actuator to output a haptic effect. After outputting the haptic effect, the method proceeds to block 750 the processor 610 executes a function associated with the command, though in some embodiments, the processor 610 may begin executing the function before generating the actuator signal or transmitting the actuator signal to the actuator.

While the methods and systems herein are described in terms of software executing on various machines, the methods and systems may also be implemented as specifically-configured hardware, such a field-programmable gate array (FPGA) specifically to execute the various methods. For example, referring again to FIGS. 1-4 and 6, embodiments can be implemented in digital electronic circuitry, or in computer hardware, firmware, software, or in combination of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

General

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A system for generating haptic effects to confirm receipt of a command, the system comprising:
   a sensor;
   a housing configured to be contacted by a user;
   an actuator configured to output a haptic effect to the housing; and
   a processor in communication with the sensor and the actuator, the processor configured to:
      receive, from the sensor, a sensor signal associated with a user input;
      recognize the user input and determine a command associated with the user input;
      if the user input is recognized and the command is determined:
         generate a first actuator signal configured to cause the actuator to output a first haptic effect; and
         transmit the first actuator signal to the actuator;
      otherwise:
         generate a second actuator signal configured to cause the actuator to output a second haptic effect; and
         transmit the second actuator signal to the actuator.

2. The system of claim 1, wherein the sensor comprises an optical sensor.

3. The system of claim 2, wherein the user input comprises a focal point of a user's eyes.

4. The system of claim 1, wherein the processor is further configured to, if the user input is recognized and the command is determined:
   execute a function associated with the user input;
   generate a third actuator signal configured to cause the actuator to output a third haptic effect; and
   transmit the third actuator signal to the actuator upon completion of execution of the function.

5. The system of claim 4, wherein the third haptic effect is configured to emulate the function.

6. The system of claim 1, further comprising a speaker in communication with the processor, and wherein the processor is further configured to:
   generate an audio signal configured to cause the speaker to output a sound; and
   transmit the audio signal to the speaker.

7. The system of claim 1, further comprising a display in communication with the processor, and wherein the processor is further configured to:
   generate a display signal configured to cause the display to display an image; and
   transmit the display signal to the display.

8. The system of claim 1, wherein the first haptic effect is configured to emulate the command.

9. The system of claim 1, wherein the sensor, actuator, and processor are disposed within the housing.

10. The system of claim 1, wherein the housing comprises one of: a device configured to be worn by the user, a mobile phone, a personal digital assistant, a touch-sensitive surface, a medical alert device, a mouse, or a keyboard.

11. The system of claim 1, wherein the user input comprises an indication of a medical emergency.

12. The system of claim 1, wherein command is a request associated with an operation, and the first haptic effect is configured to provide information associated with the status of the operation.

13. A computer-implemented method comprising the steps of:
   receiving, from a sensor, a sensor signal associated with a user input;
   recognizing the user input and determining a command associated with the speech information;
   if the user input is recognized and the command is determined:
      generating a first actuator signal configured to cause an actuator to output a first haptic effect; and transmitting the first actuator signal to the actuator;
otherwise:
   generating a second actuator signal configured to cause the actuator to output a second haptic effect; and
   transmitting the second actuator signal to the actuator.

14. The computer-implemented method of claim 13, wherein the sensor comprises an optical sensor.

15. The computer-implemented method of claim 14, wherein the user input comprises a focal point of a user's eyes.

16. The computer-implemented method of claim 13, wherein if the user input is recognized and the command is determined:
   executing a function associated with the command;
   generating a third actuator signal configured to cause the actuator to output a third haptic effect; and
   transmitting the third actuator signal to the actuator upon completion of execution of the function.

17. The computer-implemented method of claim 16, wherein the third haptic effect is configured to emulate the function.

18. The computer-implemented method of claim 13, further comprising:
   generating an audio signal configured to cause a speaker to output a sound; and
   transmitting the audio signal to the speaker.

19. The computer-implemented method of claim 13, further comprising:
   generating a display signal configured to cause a display to display an image; and
   transmitting the display signal to the display.

20. The computer-implemented method of claim 13, wherein the first haptic effect is configured to emulate the command.

* * * * *